(12) United States Patent
Haider et al.

(10) Patent No.: US 8,544,106 B2
(45) Date of Patent: Sep. 24, 2013

(54) SYSTEM AND METHOD FOR ENABLING ACCESS TO A PROTECTED HARDWARE RESOURCE

(75) Inventors: Amer Haider, Saratoga, CA (US); Steven Craig Barner, Shrewsbury, MA (US); Richard Eugene Kessler, Shrewsbury, MA (US)

(73) Assignee: Cavium, Inc., Mountain View, CA (US)

( * ) Notice: Subject to any disclaimer, the term of this patent is extended or adjusted under 35 U.S.C. 154(b) by 160 days.

(21) Appl. No.: 12/848,184

(22) Filed: Aug. 1, 2010

(65) Prior Publication Data

US 2012/0027199 A1 Feb. 2, 2012

(51) Int. Cl.
*G06F 7/04* (2006.01)

(52) U.S. Cl.
USPC .................................. 726/27; 726/30; 726/26

(58) Field of Classification Search
None
See application file for complete search history.

(56) References Cited

U.S. PATENT DOCUMENTS 7,509,250 B2 * 3/2009 Cruzado et al. ................. 703/28
7,636,859 B2 * 12/2009 Little et al. ..................... 713/191

* cited by examiner

*Primary Examiner* — Pramila Parthasarathy
(74) *Attorney, Agent, or Firm* — Cooley LLP

(57) ABSTRACT

Systems and methods are disclosed for enabling access to a protected hardware resource. A hardware component includes at least one protected hardware resource. A unique hardware ID and a unique cryptographically secure or randomly generated enable value (EV) are integrated in the hardware component at the time of manufacturing. At run-time, special software generates or receives from an external source an enable register (ER) value and a comparison is made with the stored enable value. If the ER value and the EV match, access to the protected hardware resource is allowed.

19 Claims, 12 Drawing Sheets

SYSTEM AND METHOD FOR ENABLING ACCESS TO A PROTECTED HARDWARE RESOURCE

COPYRIGHT NOTICE

A portion of the disclosure of this patent document contains material that may be subject to copyright protection. The copyright owner has no objection to the facsimile reproduction by anyone of the patent document or the patent disclosure as it appears in the Patent and Trademark Office patent file or records, but otherwise reserves all copyright rights.

TECHNICAL FIELD

The present application relates to secure authentication. More specifically, the present application relates to systems and methods for enabling access to a protected hardware resource using a secure authentication.

BACKGROUND

It is common practice in the computer and electronics industries to design hardware systems with some degree of modularity. For example, personal computers often include modular components such as motherboards, microprocessors, memory chips, video cards, audio processing cards, and the like. The use of modular components allows systems integrators to offer a wide range of systems having different performance characteristics at various price points. It also allows consumers the ability to modify or upgrade their systems by selectively replacing various components.

As a result of modular system designs, component manufacturers often produce multiple versions of a particular component. Apart from products differing based on technological advances, a component manufacturer may offer multiple products in a related product family having differing performance capabilities such as processing speed. In some cases, component manufacturers may add additional hardware modules to a component in order to provide different products. For example, a CPU manufacturer may integrate specialized graphics processing capabilities in an integrated chipset. In other cases, additional hardware may be physically present but not utilized. For example, a CPU manufacturer may sell a dual-core processor based on two processing cores on a single die. The CPU manufacturer may also sell a single-core processor that uses the same two-core die as the dual-core processor, but with only one active core. This allows the manufacturer to sell dies having a manufacturing defect in one but not both of the cores. However, the manufacturer may simply choose to disable one of two non-defective processing cores in a two-core die and sell it as a single-core processor. This strategy requires less effort than launching and maintaining a separate line of CPUs that physically have a single processing core. In such cases of a non-defective dual-core processor sold as a single-core processor, an end-user may successfully re-activate the disabled core without the manufacturer receiving any additional revenue.

In some cases, a hardware systems integrator may build hardware systems that are not necessarily designed for modular configuration. Such systems may have limited upgradeability through firmware updates. For example, firmware stored in a read-only memory (ROM) of a device may be "flashed" or upgraded with an updated version.

In the software realm, the shareware distribution model allows on-the-fly upgradeability of software applications. The term "shareware" may refer to software that is provided to users without payment on a trial basis and that is often limited by any combination of functionality, availability or convenience. Typically, there may be two versions of a shareware software application, namely an "evaluation version" and a "full version" (or "registered version"). The evaluation version may have certain feature limitations or may cease to become functional after a pre-determined amount of time or number of uses constituting an evaluation period. If a user desires to register the software, the user may purchase a registration code. Entry of a valid registration code "unlocks" the software and allows the user access to all of the features and functionality of the full version. One aim of shareware is to give consumers the opportunity to use the program and judge its usefulness before purchasing a license for the full version of the software. An added benefit is that consumers may upgrade "on-the-fly" without the need to physically obtain a separate version of the software.

It is desirable to provide systems and methods for allowing the ability to unlock hardware features on-the-fly. Such systems and methods would permit hardware component manufacturers to maintain different product lines based on a single design of a physical component. Hardware systems integrators would also enjoy economic and logistical advantages as a result of a simplified component product line. Component manufacturers and systems integrators would be able to offer novel revenue implementation strategies including time-based or usage-based subscription models for selected hardware modules. Furthermore, such systems and methods would provide simple upgrade paths to consumers without the need to physically replace components.

SUMMARY

Systems and methods are disclosed for enabling access to a protected hardware resource. A hardware component includes at least one protected hardware resource. A unique hardware ID and a unique cryptographically secure or randomly generated enable value (EV) are integrated in the hardware component at the time of manufacturing. The enable value (EV) is stored in such a way that it cannot be read by any software on the hardware component. At run-time, special software generates or receives from an external source an enable register (ER) value and a comparison is made with the stored enable value. If the ER value and the EV match, access to the protected hardware resource is allowed.

In one embodiment, a method for enabling access to a protected resource comprises, providing a unique hardware ID associated with a hardware component having a protected resource, receiving a restricted module based on at least the unique hardware ID for generating or accessing an enable register (ER) value, generating or accessing the ER value, comparing the ER value with a unique stored enable value (EV) associated with the hardware component and the protected resource, and allowing access to the protected resource if the ER value and the EV match. Providing the unique hardware ID and receiving the restricted module may be achieved through an out-of-band secure communication and authentication. The EV may be related to the hardware ID by an algorithm, such as a proprietary function or a standard cryptographic function. Alternatively, the EV may be not related to the hardware ID by any mathematical relationship. The EV may be stored in a secure location within the hardware component. The protected resource may be a cryptographic engine or module. Access to the protected resource may be allowed for a predetermined amount of time or for a predetermined number of uses.

In another embodiment, a method for enabling access to a protected resource comprises receiving a unique hardware ID associated with a hardware component having a protected resource and providing a restricted module based on at least the unique hardware ID for generating or accessing an enable register (ER) value, wherein the restricted module is configured to compare the ER value with a unique stored enable value (EV) associated with the hardware component and the protected resource and to allow access to the protected resource if the ER value and the EV match. Receiving the unique hardware ID and providing the restricted module may be achieved through an out-of-band secure communication and authentication. The EV may be related to the hardware ID by an algorithm such as a proprietary function or a standard cryptographic function. Alternatively, the EV may be not related to the hardware ID by any mathematical relationship. The EV may be stored in a secure location within the hardware component. The protected resource may be a cryptographic engine or module. Access to the protected resource may be allowed for a predetermined amount of time or for a predetermined number of uses.

In yet another embodiment, a method for enabling dormant encryption comprises providing a hardware component comprising a unique hardware ID associated with the hardware component, a protected resource including a cryptographic functionality, and a unique stored enable value (EV) associated with the hardware component and the protected resource. The method also comprises providing a restricted module based on at least the unique hardware ID for enabling access to the protected resource, wherein the restricted module is configured to generate or access an enable register (ER) value, compare the ER value with the unique stored enable value (EV), and allow access to the protected resource if the ER value and the EV match. The hardware component and the restricted module may be provided separately according to cryptographic export restrictions. Providing the restricted module is achieved through an out-of-band secure communication and authentication. The EV may be related to the hardware ID by an algorithm such as a proprietary function or a standard cryptographic function. Alternatively, the EV may be not related to the hardware ID by any mathematical relationship. The EV may be stored in a secure location within the hardware component. The protected resource may be a cryptographic engine or module subject to export restrictions. Access to the protected resource may be allowed for a predetermined amount of time or for a predetermined number of uses.

In still another embodiment, a hardware component comprises a unique hardware ID associated with the hardware component, a protected resource including a cryptographic functionality, a unique stored enable value (EV) associated with the hardware component and the protected resource, and a restricted module based on at least the unique hardware ID for enabling access to the protected resource, wherein the restricted module is configured to generate or access an enable register (ER) value, compare the ER value with the unique stored enable value (EV), and allow access to the protected resource if the ER value and the EV match.

In still yet another embodiment, a method of manufacturing a hardware component comprises providing a unique hardware ID associated with the hardware component, providing a protected resource, and storing within the hardware component a unique stored enable value (EV) associated with the hardware component and the protected resource, wherein access to the protected resource may be allowed only by utilizing a restricted module. The method further comprises providing a restricted module based on at least the unique hardware ID for enabling access to the protected resource, wherein the restricted module is configured to generate or access an enable register (ER) value, compare the ER value with the unique stored enable value (EV), and allow access to the protected resource if the ER value and the EV match.

BRIEF DESCRIPTION OF DRAWINGS

The foregoing summary, as well as the following detailed description, will be better understood when read in conjunction with the appended drawings. For the purpose of illustrating the invention, there are shown in the drawings examples that are presently preferred. It should be understood, however, that the invention is not limited to the precise arrangements and instrumentalities shown. In the drawings.

DETAILED DESCRIPTION

Reference will now be made in detail to the present examples of the invention illustrated in the accompanying drawings. Wherever possible, the same reference numbers will be used throughout the drawings to refer to the same or like elements.

Figure 1A:
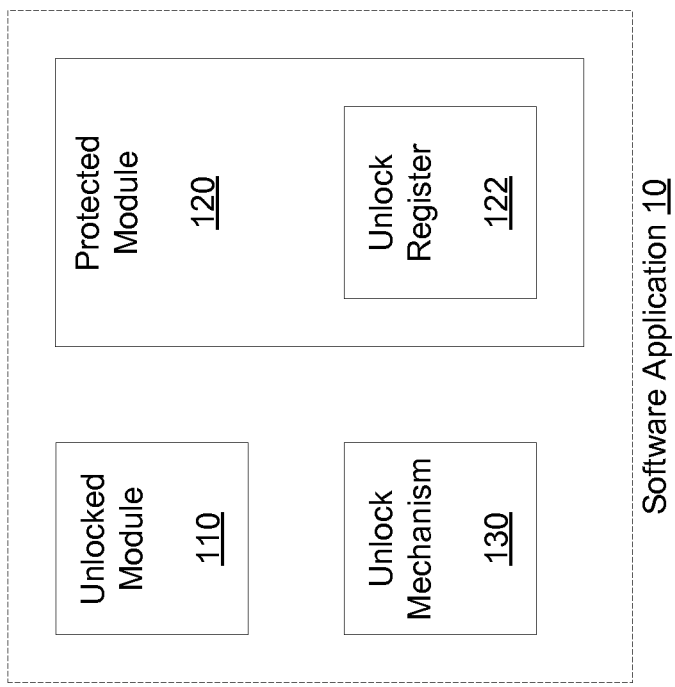
FIG. 1A illustrates a software system having unlocked and locked features.

First we will illustrate a typical system used today. FIG. 1A illustrates a software system having unlocked and locked features. Software application 10 comprises unlocked module 110, protected module 120, and unlock mechanism 130. Protected module 120 further comprises unlock register 122. Software application 10 may be any software application and may be distributed. Unlocked module 110 may comprise software routines, functions, and application features available to a user of an unregistered or lower priced copy of software application 10. Protected module 120 may comprise software routines, functions, and application features available only to a user of a registered or higher priced copy of software application 10. In other examples, protected module 120 may comprise additional features or functionality available in a "deluxe" or "professional" version of software application 10. In still other examples, software application 10 may have restrictions on usage such as a predetermined number of uses by a predetermined time period. Protected module 120 may then comprise unrestricted usage of software application 10. Unlock register 122 may store an unlock key or bit string that indicates that software application 10 is a registered copy and that protected module 120 may be accessed. Unlock mechanism 130 may be a software routine or process such as a registration process for unlocking protected module 120. It may utilize, for example, a cryptographic hashing algorithm.

Figure 1B:
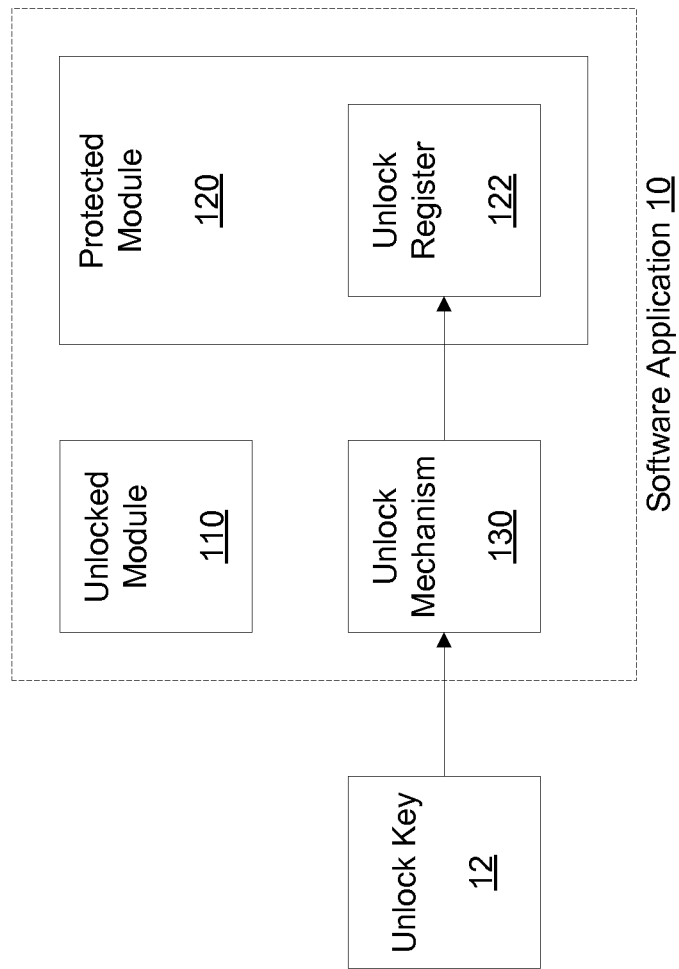
FIG. 1B illustrates a software system having unlocked and locked features and a mechanism for enabling the locked features.

FIG. 1B illustrates a software system having unlocked and locked features and a mechanism for enabling the locked features. As in FIG. 1A, software application 10 comprises unlocked module 110, protected module 120, and unlock mechanism 130. Protected module 120 further comprises unlock register 122. An unlock key 12 may be provided to the unlock mechanism 130, which writes the unlock key 12 or another bit string to unlock register 122. In this manner, protected module 120 may be accessed.

Figure 2A:
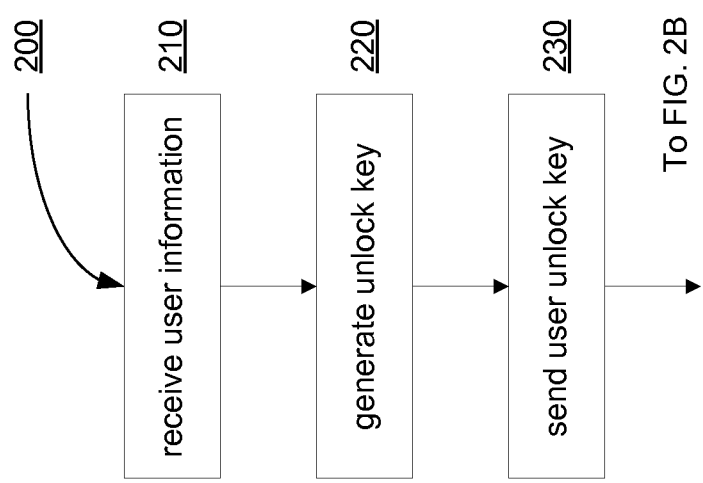
FIG. 2A illustrates a process for enabling access to locked features in a software system.

The unlock key 12 may be provided by any one of a number of techniques. For example, FIG. 2A illustrates a process for enabling access to locked features in a software system. In FIG. 2A, process 200 begins with receiving user information at step 210. User information may include, for example, the user's name or other identifier. The process continues with generating an unlock key at step 220. The unlock key may be generated, for example, using a cryptographic hashing function such as a Secure Hash Algorithm (SHA). The unlock key may be generated based on the user information received at step 210. Alternatively, the unlock key may be randomly generated or assigned to a user. The unlock key is then sent to the user at step 230. Steps 210, 220, and 230 may be performed using either an online process or an off-line process, or a combination of online and off-line processes.

Figure 2B:
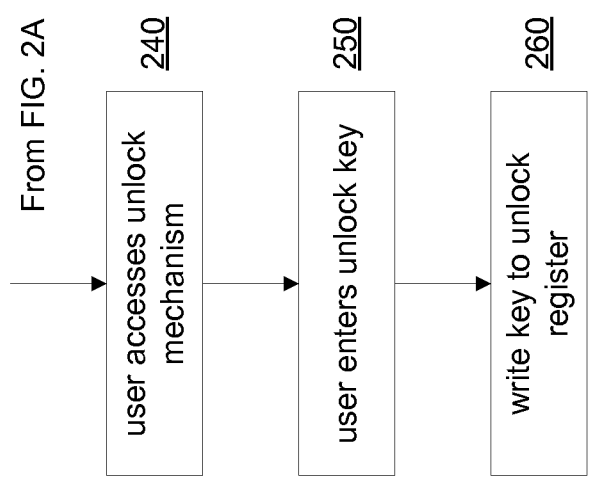
FIG. 2B illustrates a process for enabling access to locked features in a software system.

FIG. 2B illustrates a process for enabling access to locked features in a software system. In FIG. 2B, process 200 continues with the user accessing the unlock mechanism at step 240. This step may be performed, for example, by a user accessing the unlock mechanism 130 of FIG. 1B. The user enters the unlock key at step 250. The unlock mechanism 130 checks the validity of the unlock key using, for example, a cryptographic hashing function. The unlock mechanism writes a key to an unlock register at step 260. For example, the unlock mechanism 130 may write the unlock key to unlock register 122 or may write another bit string to unlock register 122 that indicates that software application 10 is a registered copy and protected module 120 may be accessed.

There are several problems with the systems and methods described above. For example, software may be readily copied from one computer system to another. Once a software application is unlocked, it may be copied and transferred in an unlocked state to another computer system. Another problem may exist with the unlock mechanism 130 of FIG. 1B. Because the unlock mechanism 130 is an integrated part of software application 10, a user may be able to use various tools to isolate the unlock mechanism 130 within the software application 10 and create a key generator for generating unlock keys. The key generator may then be used to unlock copies of software application 10 in an unauthorized manner. In fact, such a key generator may be derived from the software application 10 itself. That is, in some cases, software application 10 may include an embedded key generator as part of the unlock mechanism 130.

Figure 3A:
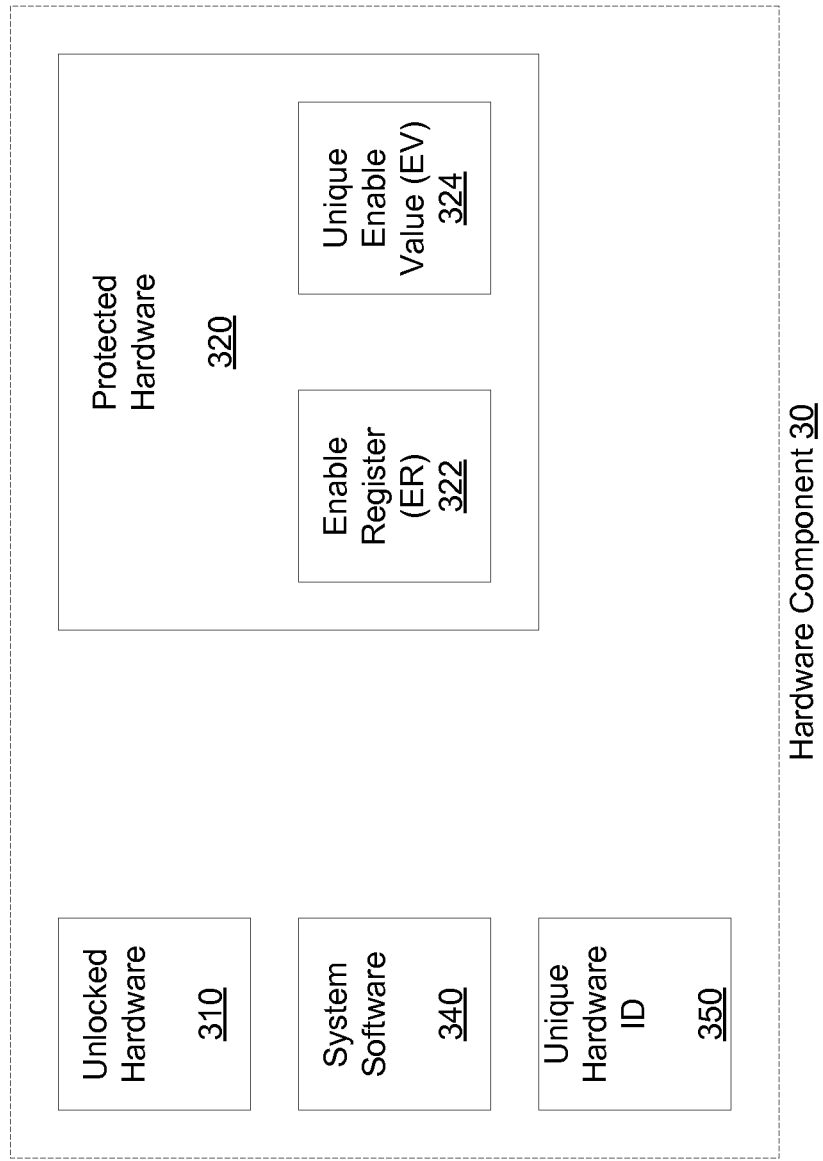
FIG. 3A illustrates a hardware system having unlocked and locked features according to an embodiment of the invention.

FIG. 3A illustrates a hardware system having unlocked and locked features according to an embodiment of the invention. Hardware component 30 comprises unlocked hardware 310, protected hardware 320, system software 340, and unique hardware ID 350. Protected hardware 320 further comprises enable register (ER) 322 and unique enable value (EV) 324. Hardware component 30 may comprise, for example, a hardware processing chip. Unlocked hardware 310 may comprise various hardware processing modules. Protected hardware 320 may comprise additional hardware processing modules providing additional or extended functionality. Examples include a dedicated graphics co-processor, a signal-processing unit, a global positioning system (GPS) processor, a hardware cryptographic engine, and the like. Enable register 322 stores a computed or generated enable register value (ER value) as will be described below. In other embodiments, ER register 322 may store an ER value that is accessed from an off-chip smart card or other hardware token, an online central key server, or an on-chip secure software storage. Unique enable value 324 may comprise a unique bit string that is not readable by any software or physical probing. System software 340 may comprise firmware and software commands for accessing various hardware modules of hardware component 30. Unique hardware ID 350 may comprise a unique serial number or other identifier that may be read by any software. Unique enable value 324 may be related to unique hardware ID 350, for example, by a cryptographic hashing function. Alternatively, the relationship between unique enable value 324 and unique hardware ID 350 may be random (or pseudo-random). That is, the unique enable value 324 may be unrelated to unique hardware ID 350 by any mathematical relationship.

Figure 3B:
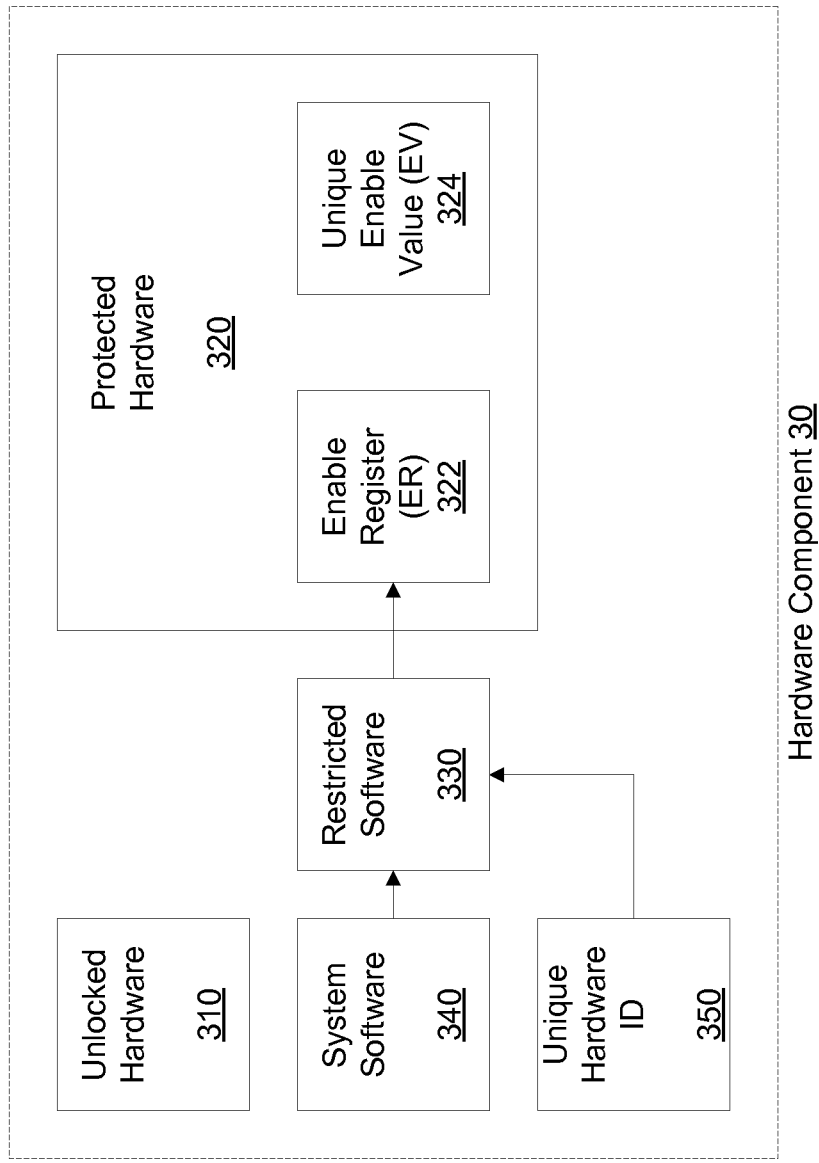
FIG. 3B illustrates a hardware system having unlocked and locked features and a mechanism for enabling access to locked features according to an embodiment of the present invention.

FIG. 3B illustrates a hardware system having unlocked and locked features and a mechanism for enabling access to locked features according to an embodiment of the present invention. As in FIG. 3A, hardware component 30 comprises unlocked hardware 310, protected hardware 320, system software 340, and unique hardware ID 350. Protected hardware 320 further comprises enable register (ER) 322 and unique enable value (EV) 324. Unique hardware ID 350 may comprise a unique serial number or other identifier that may be read by any software. Unique enable value 324 may be related to unique hardware ID 350, for example, by a cryptographic hashing function. Alternatively, the relationship between unique enable value 324 and unique hardware ID 350 may be random (or pseudo-random). That is, the unique enable value 324 may be unrelated to unique hardware ID 350 by any mathematical relationship. Hardware component 30 further comprises restricted software 330. When the system software 340 attempts to access protected hardware 320, restricted software 330 reads the unique hardware ID 350, generates or computes and/or accesses (on-chip or off-chip) an enable register value (ER value) and writes it to the enable register 322. The ER value stored in enable register 322 is compared to the unique enable value (EV) 324. If the two values match, then the system software 340 may access the protected hardware 320. For example, restricted software 330 may compute the ER value using a cryptographic hashing function or access the ER value from an off-chip smart card, online central key server or on-chip secure software storage.

Figure 4A:
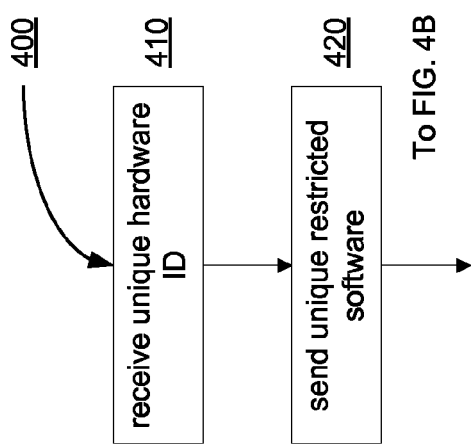
FIG. 4A illustrates a process for enabling access to locked features in a hardware component according to an embodiment of the invention.

FIG. 4A illustrates a process for enabling access to locked features in a software system according to an embodiment of the invention. The process 400 begins with receiving the unique hardware ID at step 410. For example, the hardware component 30 of FIG. 3B includes a unique hardware ID 350. The process continues with sending unique restricted software at step 420. For example, unique restricted software 330 may include a cryptographic hashing function and one or more unique values that will be used by the hashing function to reproduce the unique enable value (EV) 324. It should be noted that the unique enable value 324 may be related to the unique hardware ID 350 by a particular mathematical relationship, or there may be no relationship at all.

Figure 4B:
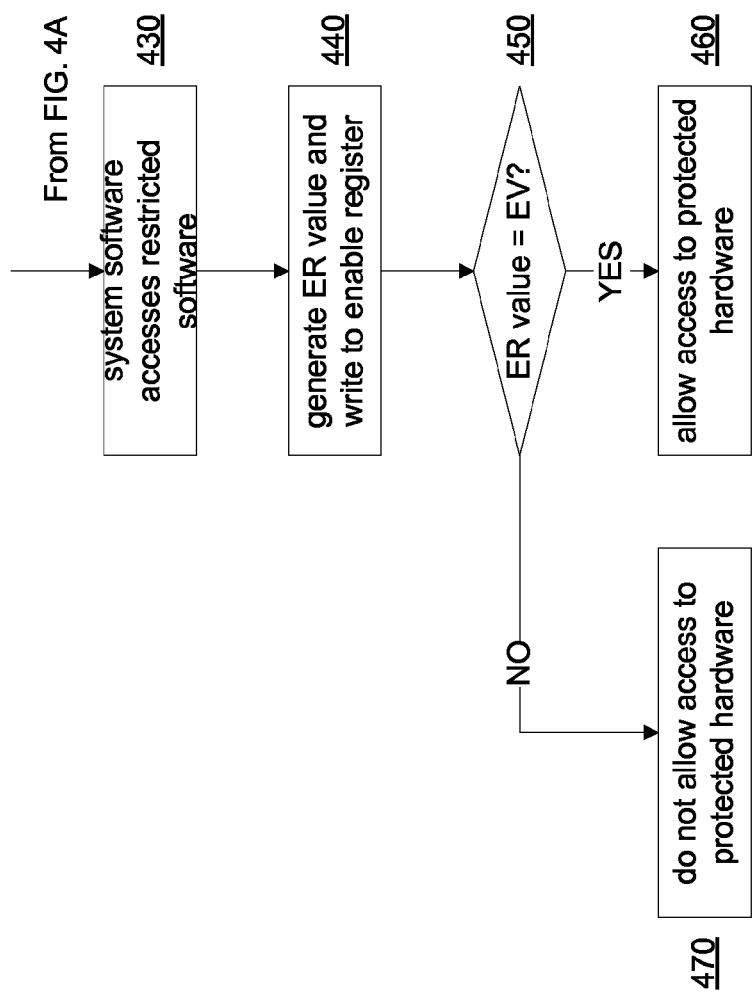
FIG. 4B illustrates a process for enabling access to locked features in a hardware component according to an embodiment of the invention.

FIG. 4B illustrates a process for enabling access to locked features in a software system according to an embodiment of the invention. The process 400 of FIG. 4A continues when system software accesses restricted software at step 430. For example, system software 340 may attempt to access protected hardware 320. The system software 340 then accesses restricted software 330. The process continues with generating an ER value and writing it to the enable register at step 440. For example, restricted software 330 may compute an ER value based on the unique hardware ID 350 and one or more unique values included within restricted software 330. The generated ER value is compared with the stored unique enable value at step 450. For example, the generated ER value is compared to the stored unique enable value 324. If the two values match, the system software is allowed access to the protected hardware at step 460. If the two values do not match, the system software is not allowed access to the protected hardware at step 470. In other embodiments, the restricted software 330 accesses the ER value from an off-chip smart card, an online central key server, or an on-chip secure software storage at step 440.

Figure 5A:
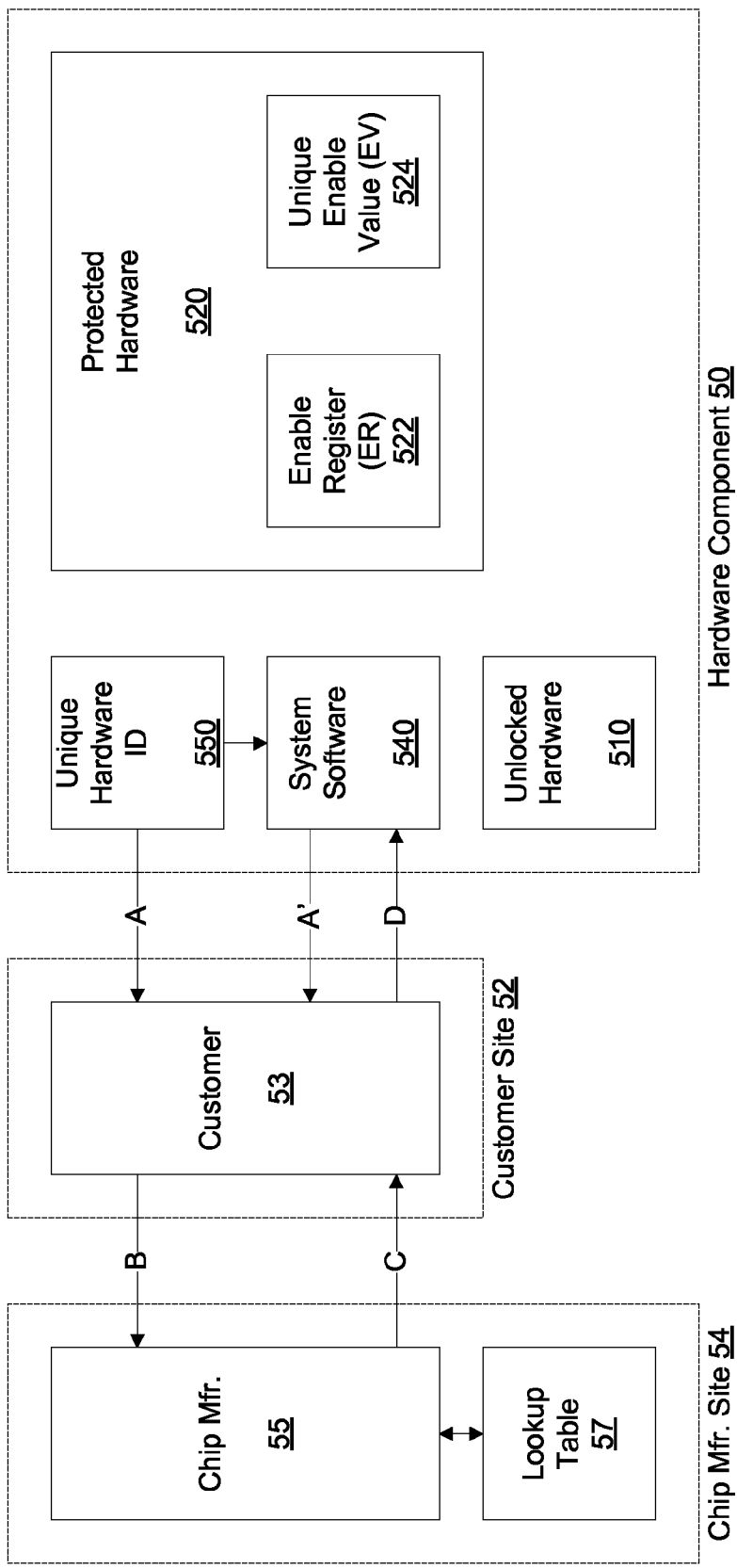
FIG. 5A illustrates a hardware system having unlocked and locked features and a process for enabling access to the locked features according to an embodiment of the invention.

FIG. 5A illustrates a hardware system having unlocked and locked features and a process for enabling access to the locked features according to an embodiment of the invention. Hardware component 50 comprises unlocked hardware 510, protected hardware 520, system software 540, and unique hardware ID 550. Protected hardware 520 further comprises enable register (ER) 522 and unique enable value (EV) 524. Hardware component 50 may comprise, for example, a hardware processing chip. Unlocked hardware 510 may comprise various hardware processing modules. Protected hardware 520 may comprise additional hardware processing modules providing additional or extended functionality. Examples include a dedicated graphics co-processor, a signal-processing unit, a global positioning system (GPS) processor, a hardware cryptographic engine, and the like. Enable register 522 stores a generated or computed enable register value (ER value) as will be described below. In other embodiments, enable register 522 stores an ER value that is accessed from an off-chip smart card, an online central key server, or an on-chip secure software storage. Unique enable value 524 may comprise a unique bit string that is not readable by any software or physical probing. System software 540 may comprise firmware and software commands for accessing various hardware modules of hardware component 50. Unique hardware ID 550 may comprise a unique serial number or other identifier that may be read by any software. Unique enable value 524 may be related to unique hardware ID 550, for example, by a cryptographic hashing function. Customer site 52 comprises customer 53. Chip manufacturer site (labeled Chip Mfr. Site) 54 comprises chip manufacturer (labeled Chip Mfr.) 55 and may further comprise lookup table 57. Customer site 52 may be, for example, a secure processing facility for communicating with chip mfr. site 54 via a secure out-of-band communication. Chip mfr. site 54 may likewise be, for example, a secure processing facility for communicating with customer site 52 via a secure out-of-band communication. That is, customer 53 may communicate with chip manufacturer 55 via a secure out-of-band communication. Preferably, customer 53 comprises a person and chip manufacturer 55 also comprises a person. In other embodiments, one or both of customer 53 and chip manufacturer 55 may comprise an automated software and hardware system. As used herein, chip manufacturer 55 may also refer to a system manufacturer, system assembler or integrator, or other provider of hardware component 50.

A customer 53 enables access to protected hardware 520 in a process that will now be described with reference to FIG. 5A and FIG. 5B. Customer 53 first determines unique hardware ID 550 associated with hardware component 50. Customer 53 may determine unique hardware ID 550 from hardware component 50 directly, for example, by visual inspection. The arrow marked "A" denotes this step. Alternatively, customer 53 may determine unique hardware ID 550 from hardware component 50 by accessing system software 540. The arrow marked "A'" denotes this alternate step. For example, customer 53 may access a menu option within system software 540 to obtain the unique hardware ID 550. Next, customer 53 provides unique hardware ID 550 to chip manufacturer 55. The arrow marked "B" denotes this step. Customer 53 may provide unique hardware ID 550 to chip manufacturer 55 via a secure out-of-band communication. For example, customer 53 may provide unique hardware ID 550 to chip manufacturer 55 via mail, telephone, fax, or electronic mail. If customer 53 utilizes electronic mail, the security and authentication of unique hardware ID 550 may be further enhanced by encrypting unique hardware ID 550 using, for example, public/private key cryptography. After chip manufacturer 55 receives the specific unique hardware ID 550 associated with the specific hardware component 50, chip manufacturer 55 provides a unique module of restricted software 530 (not shown) to customer 53. The arrow marked "C" denotes this step. For example, chip manufacturer 55 may provide unique restricted software 530 to customer 53 via a secure out-of-band communication. Unique software 530 may include, for example, a cryptographic hashing function and one or more values that the hashing function will use, along with the unique hardware ID 550 to generate the ER value. The unique software 530 is specifically tailored to the specific hardware component 50 and is designed to reproduce the specific stored unique enable value (EV) 524 associated with a specific hardware component 50. That is, unique software 530 can be used to enable access only to protected resource 520 for the specific hardware component 50. It cannot be used with other hardware components. Chip manufacturer 55 may access lookup table 57 in order to provide the correct and specific unique software 530 based on the specific unique hardware ID 550. Lookup table 57 may comprise, for example, a database relating unique hardware IDs associated with corresponding unique enable values. In this way, the unique software 530 is based on at least the unique hardware ID 550. Chip manufacturer 55 may provide unique restricted software 530 to customer 53 via a secure out-of-band communication. For example, customer 53 may provide unique restricted software 530 to customer via mail on physical computer-readable media (e.g., an optical disc, magnetic disk, or semiconductor memory device) or via electronic mail or another online communication. In either case, security and authentication of unique restricted software 530 may be further enhanced by encrypting unique restricted software 530 using, for example, public/private key cryptography or by providing password-protected files. Unique restricted software may comprise, for example, an executable file or other binary file readable by system software 540. After customer 53 receives unique software module 530, customer 53 may install restricted software 530 on hardware component 50. The arrow marked "D" denotes this step. In other embodiments, chip manufacturer 55 may additionally provide a unique smart-card 532 (not shown) or other hardware token capable of storing or generating an ER value. The unique software 530 can thus access the ER value from an off-chip smart card. In still other embodiments, the unique software 530 may access the ER value from an online central key server or an on-chip secure software storage.

Figure 5B:
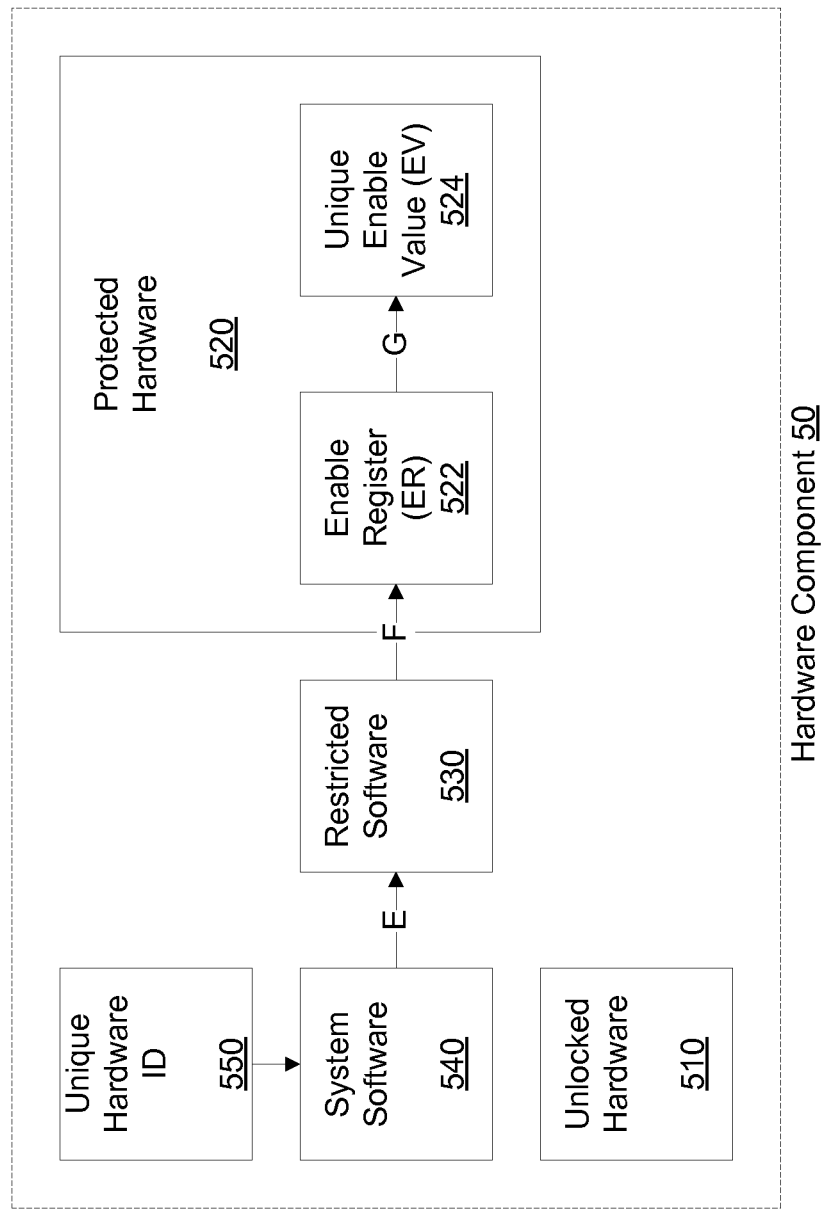
FIG. 5B illustrates a hardware system having unlocked and locked features and a process for enabling access to the locked features according to an embodiment of the present invention.

FIG. 5B illustrates a hardware system having unlocked and locked features and a process for enabling access to locked features according to an embodiment of the present invention. As in FIG. 5A, hardware component 50 comprises unlocked hardware 510, protected hardware 520, system software 540, and unique hardware ID 550. Protected hardware 520 further comprises enable register (ER) 522 and unique enable value (EV) 524. Unique hardware ID 550 may comprise a unique serial number or other identifier that may be read by any software. Unique enable value 524 may be related to unique hardware ID 550, for example, by a cryptographic hashing function. Alternatively, the relationship between unique enable value 524 and unique hardware ID 350 may be random (or pseudo-random) and determined only by the lookup table 57 in FIG. 5A. Hardware component 50 further comprises restricted software 530, having been installed as described with reference to FIG. 5A.

With reference now to FIG. 5B, the process described with reference to FIG. 5A is further described. If the system software 540 attempts to access protected hardware 520, system software 540 causes restricted software 530 to generate or access an enable register (ER) value and write it to ER register 522. System software first provides restricted software 530 with unique hardware ID 550. The arrow marked "E" denotes this step. Next, restricted software 530 generates or accesses the ER value and write it to enable register 522. The arrow marked "F" denotes this step. The ER value may be generated based on at least unique hardware ID 550. In other embodiments, the ER value may be accessed from an off-chip smart card, an online central key server, or an on-chip secure software storage. Next, restricted software 530 compares the ER value stored in enable register 522 to the unique enable value (EV) 524. The arrow marked "G" denotes this step. If the two values match, then the system software 540 may access the protected hardware 520. For example, restricted software 530 may compute the ER value using a cryptographic hashing function.

Figure 6:
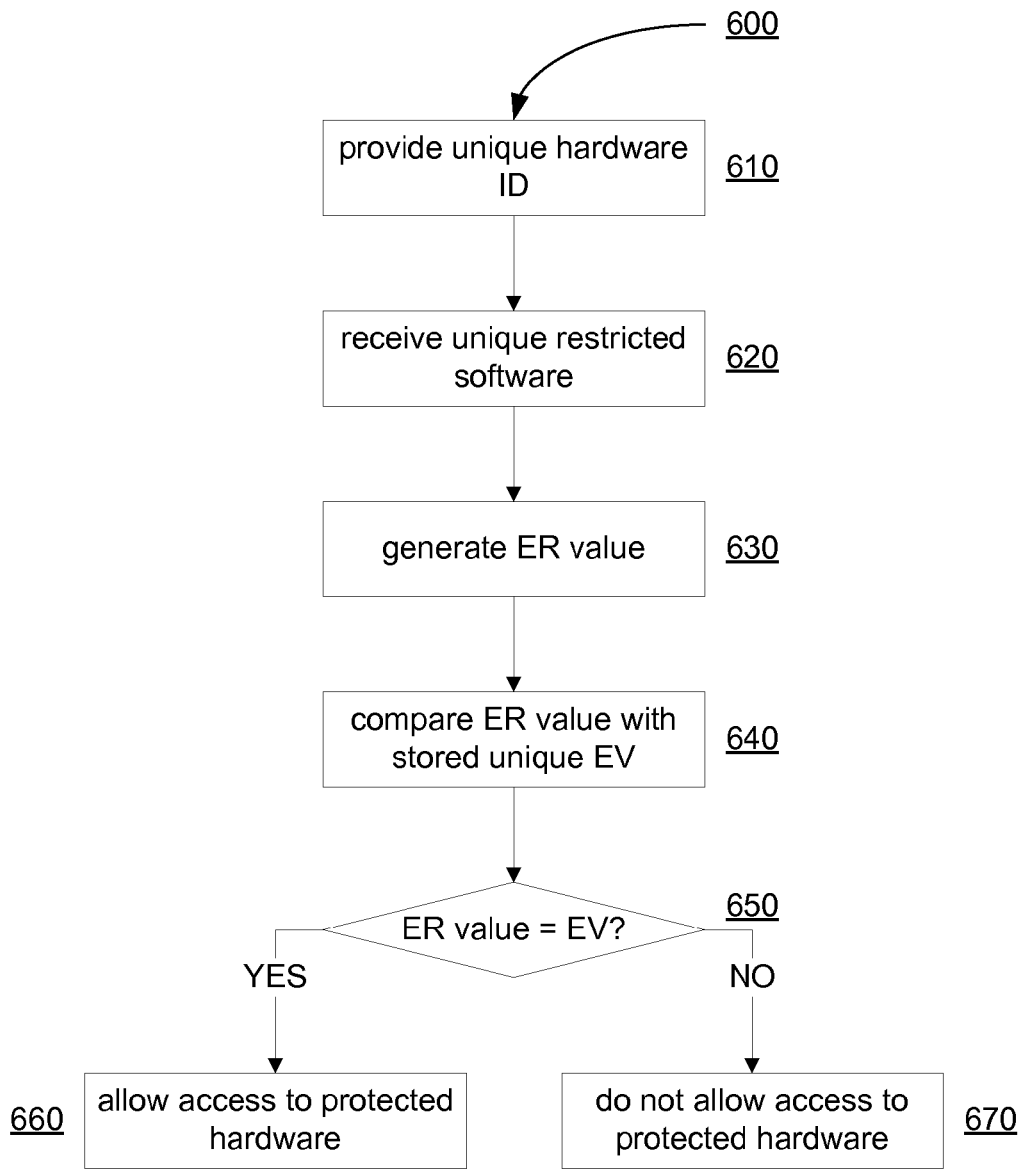
FIG. 6 illustrates a method for enabling access to a protected hardware resource according to an embodiment of the invention.

FIG. 6 illustrates a method for enabling access to a protected hardware resource according to an embodiment of the invention. The method is described from the point of view of a customer and with reference to FIGS. 5A and 5B. The process 600 begins with providing a unique hardware ID at step 610. For example, the hardware component 50 of FIG. 5A includes a unique hardware ID 550. A customer 53 may determine unique hardware ID 550 from hardware component 50 directly, for example, by visual inspection. Alternatively, customer 53 may determine unique hardware ID 550 from hardware component 50 by accessing system software 540. For example, customer 53 may access a menu option within system software 540 to obtain the unique hardware ID 550. Customer 53 provides unique hardware ID 550 to chip (or system) manufacturer 55 via a secure out-of-band communication. For example, customer 53 may provide unique hardware ID 550 to chip manufacturer 55 via mail, telephone, fax, or electronic mail. If customer 53 utilizes electronic mail, the security of unique hardware ID 550 may be further enhanced by encrypting and authenticating unique hardware ID 550 using, for example, public/private key cryptography.

The process continues with receiving unique restricted software at step 620. For example, unique restricted software 530 may include a cryptographic hashing function and one or more unique values that will be used by the hashing function to generate the ER value 522. Unique restricted software 530 is designed to reproduce the stored unique enable value 524 associated with hardware component 50. It should be noted that the unique enable value 524 may be related to the unique hardware ID 550 by a particular relationship. Alternatively, the relationship between unique enable value 524 and unique hardware ID 350 may be random (or pseudo-random) and determined only by the lookup table 57 in FIG. 5A.

The process continues when system software accesses restricted software to generate the ER value at step 630. For example, system software 540 may attempt to access protected hardware 520. System software 540 then accesses restricted software 530. Restricted software 630 may compute an ER value based on the unique hardware ID 550 and one or more unique values included within restricted software 530. The restricted software 530 writes the ER value to the enable register 522. The process continues with comparing the generated ER value with a stored unique enable value (EV) at step 640. For example, the generated ER value stored in enable register 522 is compared to the stored unique enable value 524. If the two values match, the system software 540 is allowed access to the protected hardware 520 at step 660. If the two values do not match, the system software 540 is not allowed access to the protected hardware 520 at step 670. In other embodiments, at step 630 the ER value may be accessed from an off-chip smart card, an online central key server, or an on-chip secure software storage.

Figure 7:
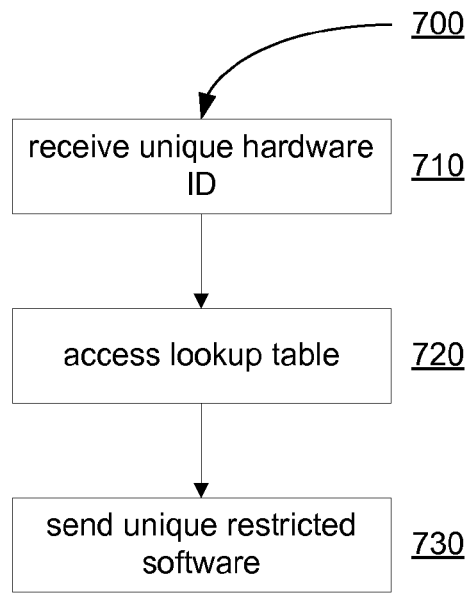
FIG. 7 illustrates a method for enabling access to a protected hardware resource according to an embodiment of the invention.

FIG. 7 illustrates a method for enabling access to a protected hardware resource according to an embodiment of the invention. The method is described from the point of view of a chip manufacturer and with reference to FIGS. 5A and 5B. The process 700 begins with receiving a unique hardware ID at step 710. Chip or System manufacturer 55 may receive unique hardware ID 550 from customer 53 via a secure out-of-band communication. For example, chip manufacturer 55 may receive unique hardware ID 550 from customer 53 via mail, telephone, fax, or electronic mail. If customer 53 utilizes electronic mail, the security of unique hardware ID 550 may be further enhanced by encrypting unique hardware ID 550 using, for example, public/private key cryptography.

The process continues with the chip manufacturer accessing a lookup table at step 720. Chip manufacturer 55 may access lookup table 57 in order to provide the correct and specific unique software 530 based on the specific unique hardware ID 550. Lookup table 57 may comprise, for example, a database relating unique hardware IDs associated with corresponding unique enable values.

The process continues with providing a unique module of restricted software at step 730. For example, chip manufacturer 55 may provide unique restricted software 530 to customer 53 via a secure out-of-band communication. Unique software 530 may include, for example, a cryptographic hashing function and one or more values that the hashing function will use, along with the unique hardware ID 550 to generate the ER value. The unique software 530 is specifically tailored to the specific hardware component 50 and is designed to reproduce the specific stored unique enable value (EV) 524 associated with a specific hardware component 50. In other embodiments, chip manufacturer 55 may additionally provide a unique smart-card 532 (not shown) or other hardware token capable of storing or generating an ER value. The unique software 530 can thus access the ER value from an off-chip smart card. In still other embodiments, the unique software 530 may access the ER value from an online central key server or an on-chip secure software storage.

By providing hardware such as the hardware component 30 of FIG. 3A including unlocked hardware 310 and protected hardware 320, a hardware device manufacturer (e.g., chip manufacturer) may offer multiple versions of its devices without having to modify the devices. This allows in-field upgradeability of devices. It also allows time-based or usage-based enablement and disablement of features. For example, protected hardware 320 could be made accessible on a trial basis. After a certain number of uses or after the expiration of a predetermined amount of time, protected hardware 320 could be made inaccessible. Access to protected hardware 320 could be restored in accordance with the disclosed embodiments.

Embodiments of the present invention may be applied to allow hardware manufacturers to provide hardware devices including embedded cryptography for export out of the United States. Export and re-export controls on commercial encryption products are administered by the Bureau of Industry and Security (BIS) of the U.S. Department of Commerce. Rules governing exports and re-exports of encryption items are found in the Export Administration Regulations (EAR), 15 C.F.R. Parts 730-774. Sections 740.13, 740.17 and 742.15 of the EAR are the principal references for the export and re-export of encryption items. The term "dormant cryptography" refers to items that, at the time of export, contain embedded cryptographic parts or components that are rendered functionally inert or inactive by design. This dormant cryptography must be "activated" or "enabled" (typically using special components or software purchased separately) by the manufacturer before it can be used to encrypt data. Items with "dormant cryptography", and the associated commodities, software, or technology by which the cryptography is enabled, are controlled under the EAR and subject to all applicable EI (encryption items), NS (national security), and AT (anti-terrorism) controls.

With reference to FIG. 3A and FIG. 3B, for example, protected hardware 320 may be a cryptographic engine. Access to the cryptographic engine may be disabled by default. The hardware component 30 may then be readily exported under a dormant encryption classification. The hardware component 30 may then be incorporated into products by a hardware systems integrator. The restricted software 330 may be sold separately only for approved exports. Advantageously, the unlocking mechanism (i.e., the restricted software 330 and key) is unique to each hardware component 30 and is cryptographically secure. The restricted software 330 may be obtained through an out-of-band secure communication and authentication.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

We claim:

1. A method for selectively enabling access to a protected resource, the method comprising:
   providing a unique hardware ID associated with a hardware component having a protected resource;
   receiving a restricted software module based on at least the unique hardware ID;
   executing the restricted software module on the hardware component to generate or access an enable register (ER) value;
   comparing the ER value with a unique stored enable value (EV) stored in a secure location in the hardware component and the protected resource; and
   allowing access to the protected resource if the ER value and the EV match.

2. The method of claim 1, wherein providing the unique hardware ID is achieved through secure communication and authentication.

3. The method of claim 1, wherein receiving the restricted software module is achieved through secure communication and authentication.

4. The method of claim 1, wherein the EV has a relationship to the hardware ID.

5. The method of claim 4, wherein the relationship is defined by one of a proprietary function or a standard cryptographic function.

6. The method of claim 1, wherein the EV is not related to the hardware ID by any mathematical relationship.

7. The method of claim 1, wherein the protected resource is a cryptographic engine or module.

8. The method of claim 1, wherein access to the protected resource is allowed for a predetermined amount of time.

9. The method of claim 1, wherein access to the protected resource is allowed for a predetermined number of uses.

10. A method for enabling access to a protected resource, the method comprising:
    receiving a unique hardware ID associated with a hardware component having a protected resource; and
    providing a restricted software module based on at least the unique hardware ID, wherein the restricted software module is configured to generate or access an enable register (ER) value; wherein the restricted software module is configured to compare the ER value with a unique stored enable value (EV) stored in a secure location in the hardware component and the protected resource and to allow access to the protected resource if the ER value and the EV match.

11. The method of claim 10, wherein receiving the unique hardware ID is achieved through secure communication and authentication.

12. The method of claim 10, wherein providing the restricted software module is achieved through secure communication and authentication.

13. The method of claim 10, wherein the EV has a relationship to the hardware ID.

14. The method of claim 13, wherein the relationship is one of a proprietary function or a standard cryptographic function.

15. The method of claim 10, wherein the EV is not related to the hardware ID by any mathematical relationship.

16. The method of claim 10, wherein the protected resource is a cryptographic engine or module.

17. The method of claim 10, wherein access to the protected resource is allowed for a predetermined amount of time.

18. The method of claim 10, wherein access to the protected resource is allowed for a predetermined number of uses.

19. A hardware component, comprising:
    a unique hardware ID associated with the hardware component;
    a protected resource;
    a permanently stored unique enable value (EV) associated with the hardware component and the protected resource, wherein the EV is stored in a secure location within the hardware component; and a restricted software module based on at least the unique hardware ID for selectively enabling access to the protected resource, wherein the restricted software module is executed by the hardware component to:
generate or access an enable register (ER) value;
compare the ER value with the EV; and
allow access to the protected resource if the ER value and the EV match.

* * * * *